Nov. 26, 1968 T. S. ANDERSSON 3,412,695

BAKING OVENS

Filed Sept. 20, 1965  2 Sheets-Sheet 2

INVENTOR
TORE S. ANDERSSON

3,412,695
BAKING OVENS
Tore S. Andersson, Guldbrandsgatan 27, Boras, Sweden
Filed Sept. 20, 1965, Ser. No. 488,819
1 Claim. (Cl. 107—55)

ABSTRACT OF THE DISCLOSURE

The present baking oven has means for supporting material to be baked which includes at least one wheeled truck having baking trays and capable of being wheeled into and out of the oven and when in the oven, supported on a rotatably driven bearing number for rotating the truck thereon.

Background of the invention

This invention relates to baking ovens of the kind having in it a platform on which one or more trucks loaded with baking trays can be placed. The trucks enter the baking ovens through a door. Baking ovens of the kind specified have heat-yielding members and the heating must be distributed to ensure uniform baking. Accordingly, a blower is provided which directs the air in the required direction. To achieve this, after baking has been proceeding for some time, the air flow is reversed so as to go to the opposite side as compared with previously. This step on its own is insufficient and it is also necessary for the truck to be removed from the oven, turned through a right-angle, then reintroduced, whereafter the working cycle just outlined is repeated. Unfortunately, this laborious procedure does not guarantee uniformly baked bread. Removing the truck from the oven in order to turn the truck round, as well as being a nuisance, leads to considerable heat losses and to an interruption of the heating cycle, with a consequent impairment of uniform production. Also the blower provided must be very large.

Description

Figure 1:
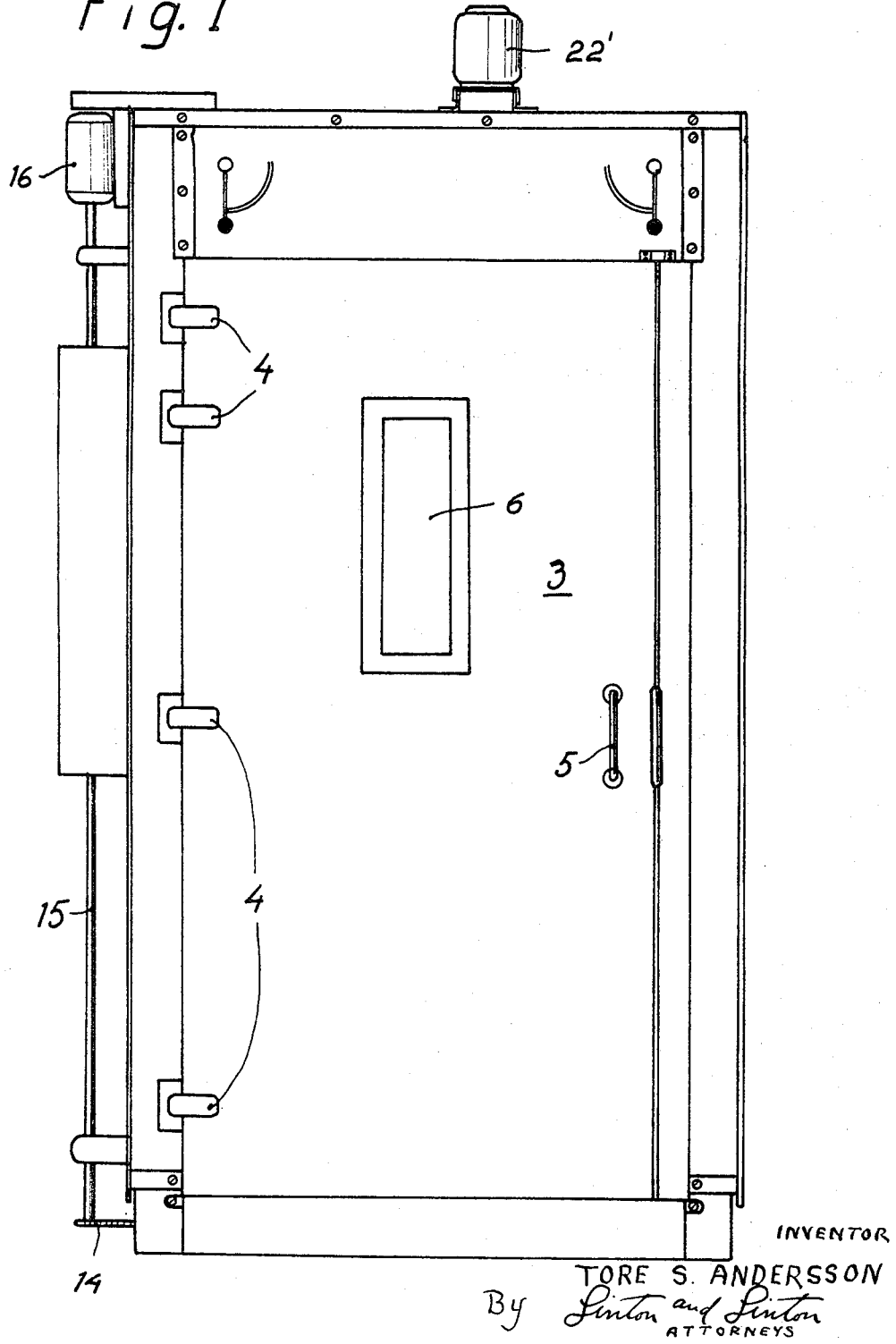
Figure 2:
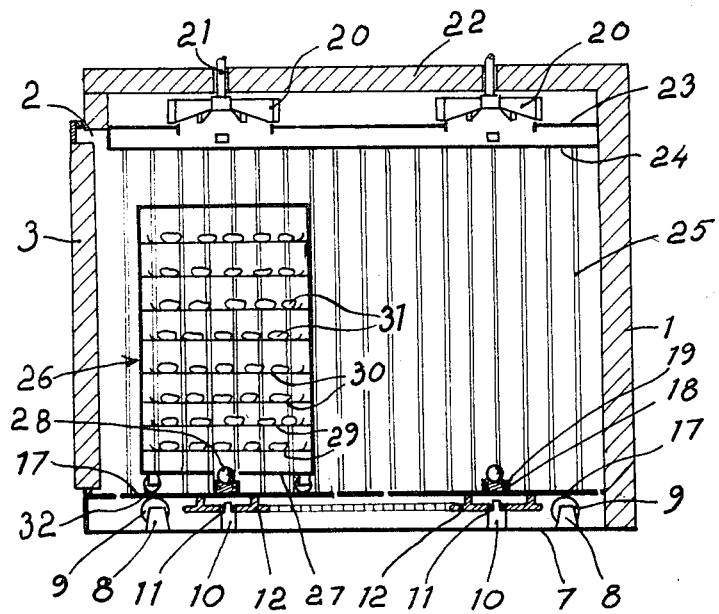
Figure 3:
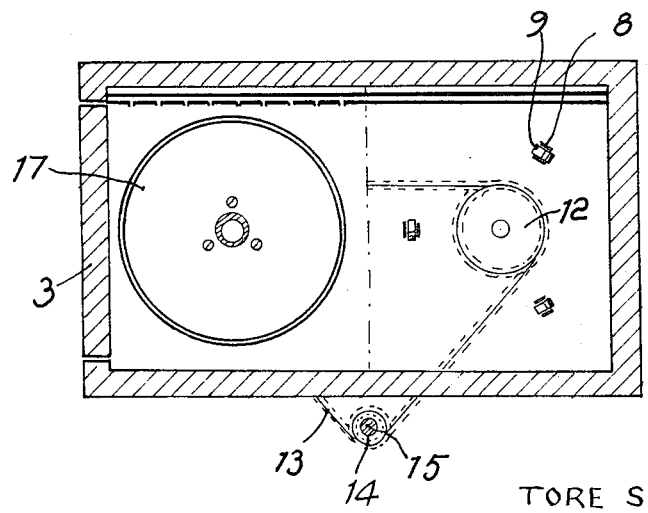

The invention obviates these and other disadvantages.
An exemplary embodiment of the invention is shown in the accompanying drawings in which;
FIG. 1 is a front view, showing the entire oven.
FIG. 2 is a section on a reduced scale.
And FIG. 3 is a top plan view with the top plate and one of the platforms removed.

The oven comprises an outer casing 1 which has an opening 2 which may be closed by means of a door 3, which as shown, is hinged to the casing as at 4 and may be provided with a handle 5 and an inspection window 6. The bottom plate 7 of the oven has secured thereto brakets 8 each holding a roller 9 for a purpose which will soon be described. Secured to the bottom plate are also two studs 10 having each an upper cylindrical portion 11 of less diameter than the lower portion. Upon each of the cylindrical portions 11 is mounted a chain sprocket 12. In FIG. 3 is shown how a chain 13, which runs over a sprocket 14, secured to a vertical shaft 15, also runs over the sprockets 12 of which only the right one is shown in FIG. 3. The vertical shaft 15 is coupled to a power unit for example an electric motor 16 as shown in FIG. 1. Each of the sprockets 12 supports a platform or bearing member 17, which near to its periphery is supported by the rollers 9 previously referred to. It is clear that when motor 16 causes shaft 15 to rotate, both platforms 17 will also be caused to fulfill a rotational movement. Centrally disposed on each platform 17 is a socket 18, which holds a coil spring 19 resiliently pressing a ball 28 upwards. The heating system of the oven includes two blowers 20 each having a shaft 21 which passes through the top 22 of the casing and is connected to a motor 22'. The blowers are fastened to an intermediate wall 23, located on a vertical distance above a wall 24. The compartment between walls 23 and 24 communicates with an end compartment having one wall perforated or built up by slats 25 through which the heated air may pass.

The invention also includes specially designed trucks 26, each comprising a bottom plate 27 with a centrally disposed hole for cooperation with the ball or catch member 28 in each socket 18 in order to center the truck relative to platform 17. Each truck has a plurality of shelves or rails 29 to receive baking trays 30, upon which the dough pieces to be baked, may be charged as at 31. The trucks also are provided with rollers 32.

After having been charged with dough pieces the trucks are introduced into the oven through door 3 and engaged by the balls 28. During baking the platforms and the trucks placed thereupon are rotated and a completely uniform baking treatment is thus obtained and all the disadvantages hereinbefore referred to are also obviated.

I claim:
1. In a baking oven, means for supporting the material to be baked comprising at least one wheeled truck having baking trays and capable of being wheeled into and out of the oven, at least one rotatably driven bearing member in the oven capable of having said truck placed thereon when in said oven, a catch member centrally located on said bearing member and said truck having a centrally disposed hole for receiving said catch member whereby said catch member can detachably hold said truck on said bearing member for rotation therewith.

References Cited

UNITED STATES PATENTS

| 762,459 | 6/1904 | Ycre | 107—56 |
| 851,711 | 4/1907 | Tory | 107—56 |
| 3,016,627 | 1/1962 | Freund | 344—187 |

FOREIGN PATENTS 599,119   10/1959   Italy.

WALTER A. SCHEEL, *Primary Examiner.*
J. SHEA, *Assistant Examiner.*